(12) United States Patent
Takemasa

(10) Patent No.: US 6,363,741 B2
(45) Date of Patent: Apr. 2, 2002

(54) REFRIGERANT COMPOSITION AND REFRIGERATING APPARATUS

(75) Inventor: Kazuo Takemasa, Ohta (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/824,406

(22) Filed: Apr. 2, 2001

Related U.S. Application Data

(62) Division of application No. 08/557,933, filed on Nov. 14, 1995, now abandoned, which is a continuation of application No. 08/277,474, filed on Jul. 19, 1994, now abandoned.

(30) Foreign Application Priority Data

Dec. 20, 1993 (JP) ............................................. 5-345046

(51) Int. Cl.$^7$ ............................. C09K 5/04; F25B 43/02
(52) U.S. Cl. ............................. 62/469; 252/67; 252/68; 62/502
(58) Field of Search ................. 8/67, 68; 62/114, 62/469, 502

(56) References Cited

U.S. PATENT DOCUMENTS

| | | | |
|---|---|---|---|
| 4,046,533 A | 9/1977 | Olund | 252/67 |
| 4,482,465 A | 11/1984 | Gray | 252/67 |
| 5,185,094 A | 2/1993 | Shiflett | 252/67 |
| 5,254,280 A | 10/1993 | Thomas et al. | 252/68 |
| 5,395,544 A * | 3/1995 | Hagihara et al. | |
| 5,458,798 A | 10/1995 | Lunger et al. | 252/67 |
| 5,601,753 A | 2/1997 | Omure et al. | 252/67 |
| 5,688,432 A | 11/1997 | Pearson | 252/67 |

FOREIGN PATENT DOCUMENTS

| | | |
|---|---|---|
| EP | 430169 | 6/1991 |
| EP | 451692 | 10/1991 |
| EP | 509673 | 10/1992 |
| JP | 1-139675 | 6/1989 |
| JP | 1-139678 | 6/1989 |
| JP | 4-18484 | 1/1992 |
| JP | 6-220430 | 8/1994 |
| JP | 9-208940 | 8/1997 |
| WO | 9211339 | 7/1992 |

* cited by examiner

Primary Examiner—Margaret Einsmann
(74) Attorney, Agent, or Firm—Weingarten, Schurgin, Gagnebin & Lebovici LLP

(57) ABSTRACT

A refrigerant composition comprising difluoromethane (R-32), pentafluoroethane (R-125), 1,1,1,2-tetrafluoroethane (R-134a), and n-pentane, preferably prepared by mixing n-pentane preliminarily in R-134a, and mixing into a refrigerant of R-32 and R-125, with the n-pentane contained in a range of 0.1 wt. % to 14 wt. % of the total weight, and a refrigerating apparatus employing the refrigerant composition composed of above. It is an object of the present invention to develop a nonflammable refrigerant composition capable of using refrigerating machine oil such as mineral oil and alkyl benzene which is used in refrigerating apparatus, none in risk of destroying the ozone layer, excellent in cooling performance, superior in lubricating performance, and outstanding in heat resistance.

6 Claims, 4 Drawing Sheets

Compatible characteristic curve of n-pentane in R-134a

REFRIGERANT COMPOSITION AND REFRIGERATING APPARATUS

CROSS-REFERENCE TO RELATED APPLICATIONS

This application is a divisional application of application Ser. No. 08/557,933 now abandoned, filed Nov. 14, 1995, which was re-filed as a continued prosecution application on Feb. 12, 1998 and on Feb. 13, 1999, and was a continuation of application Ser. No. 08/277,474 now abandoned, filed Jul. 19, 1994.

BACKGROUND OF THE INVENTION

1. Field of the Invention

The present invention relates to a refrigerant composition and a refrigerating apparatus, and more particularly to a refrigerant composition which does not destroy the ozone layer, is nonflammable, is compatible well with refrigerating machine oil such as mineral oil and alkyl benzene, and presents a stable and uniform liquid phase, and to a refrigerating apparatus using the same.

2. Background Art

The conventional refrigerant hitherto used in the refrigerating machine is mostly dichlorodifluoromethane (hereinafter called R-12), or R-500 composed of an azeotropic mixture refrigerant of R-12 and 1,1-difluoroethane (hereinafter called r-152a). The boiling point of R-12 is −29.65° C. at atmospheric pressure, and that of R-500 is −33.45° C., which are ideal for ordinary conventional refrigerating apparatuses. Even when a suction temperature into a compressor is relatively high, they have properties of not raising the discharge temperature so high as to induce oil sludge of the compressor. Moreover, R-12 is compatible well with the refrigerating machine oil such as mineral oil of the compressor, and plays a role of returning the oil in the refrigerant circuit into the compressor.

These refrigerants, however, have a high latency of ozone destruction, and when released into the atmosphere to reach the ozone layer high above the earth, they destroy the ozone layer. The ozone layer destruction is induced by chlorine radical (Cl) in the constructions of the refrigerants. Accordingly, refrigerants not containing chlorine radical are expected as substitute refrigerants, such as difluoromethane (hereinafter called R-32), pentafluoroethane (hereinafter called R-125), and 1,1,1,2-tetrafluoroethane (hereinafter called R-134a). The boiling point of R-32 is −51.7° C. at atmospheric temperature, that of R-125 is −48.5° C., and that of R-134a is −26.0° C.

These chlorine radical-free refrigerants R-32, R-125 and R-134a are poor in compatibility with general refrigerating machine oil such as mineral oil or alkyl benzene, and often caused lubrication troubles of the compressor due to worsening of returning of oil to the compressor, or sucking refrigerants separated from oil upon starting after shutdown, etc.

Accordingly, the present inventor attempted to mix these refrigerants which are poor in compatibility with mineral oil or alkyl benzene with n-pentane excellent in compatibility with them, and discovered that the refrigerating machine oil such as mineral oil and alkyl benzene discharged from the compressor into the refrigerant circuit can be recovered into the compressor even when using these refrigerant mixture.

The invention is hence intended to solve the above problems by presenting a refrigerant composition with a purpose of using refrigerating machine oil such as mineral oil and alkyl benzene in a refrigerant not containing chlorine radical, by blending a chlorine radical-free refrigerant with n-pentane having a boiling point of +36.07° C. at atmospheric pressure, and a refrigerating apparatus using the same.

On the other hand, when the a chlorine radical-free refrigerant and n-pentane are separately supplied in refrigerating circuits, it is very difficult to feed them uniformly into the refrigerating circuits because of difference in vapor pressure between the two having difference in boiling point. Furthermore since the mixture of the two is not a uniform liquid phase, oil return to the compressor may be not sufficient. In addition, there is risk of fire induced if such refrigerant composition leaks. Accordingly, it is other object of the present invention to solve such problems by mixing such chlorine radical-free refrigerant and n-pentane preliminarily, and using them as a refrigerant composition having a stable and uniform liquid phase.

As a result of intensive study on the above subjects, the inventor has discovered that a nonflammable refrigerant composition having a stable and uniform liquid phase can be obtained by mixing a refrigerant poor in compatibility with mineral oil or alkyl benzene preliminarily with a specified amount of n-pentane having a boiling point of +36.07° C. at atmospheric pressure excellent in compatibility with mineral oil or alkyl benzene, and that the refrigerating machine oil such as mineral oil and alkyl benzene discharged from the compressor into the refrigerant circuit can be recovered into the compressor even when such refrigerant composition is employed, thereby solving the above problems, and hence completed the invention.

SUMMARY OF THE INVENTION

The feature of the present invention relates to a refrigerant composition comprising difluoromethane, pentafluoroethane, 1,1,1,2-tetrafluoroethane, and n-pentane.

Furthermore, another feature of the present invention relates to a refrigerant composition prepared by mixing n-pentane preliminarily with 1,1,1,2-tetrafluoroethane, and mixing the mixture into a refrigerant of difluoromethane and pentafluoroethane, wherein the contained n-pentane is in a range of 0.1 wt. % to 14 wt. % of the total weight.

In addition, the third feature of the present invention relates to a refrigerant composition containing n-pentane by 14 wt. % or more in the preliminary mixture with 1,1,1,2-tetrafluoroethane, and by 14 wt. % or less in the finally resulted refrigerant.

The fourth feature of the present invention relates to a refrigerant composition composed of 1,1,1,2-tetrafluoroethane and n-pentane, wherein n-pentane is dissolved in 1,1,1,2-tetrafluoroethane in a range of 0.1 wt. % to 7.3 wt. % of total weight.

The fifth feature of the present invention relates to a refrigerating apparatus comprising a condenser for condensing and liquefying a refrigerant, an evaporator for evaporating a liquefied refrigerant, and a compressor for compressing an evaporated and vaporized refrigerant and discharging it into the condenser, wherein a refrigerant composition is used as the refrigerant to be compressed by the compressor.

The sixth feature of the present invention relates to a refrigerating apparatus wherein a refrigerant composition having n-pentane dissolved in 1,1,1,2-tetrafluoroethane by about 6 wt. % of the total weight.

Furthermore, the seventh feature of the present invention relates to a refrigerating apparatus wherein mineral oil or alkyl benzene oil is used as refrigerating machine oil.

The eighth feature of the present invention relates to a refrigerating apparatus wherein a rotary compressor is used as the compressor and alkyl benzene oil is used as refrigerating machine oil.

As the present invention is thus constituted, by mixing n-pentane excellent in compatibility with refrigerating machine oil such as mineral oil and alkyl benzene with a chlorine radical-free refrigerant poor in compatibility with refrigerating machine oil such as mineral oil and alkyl benzene, the refrigerating machine oil such as mineral oil and alkyl benzene discharged from the compressor into the refrigerant circuit can be recovered in the compressor.

In the present invention, moreover, n-pentane which is flammable and is hardly miscible with refrigerant such as R-32 and R-125 at ordinary temperature is preliminarily mixed in refrigerant R-134a at a predetermined rate, and is further mixed with refrigerants R-32 and R-125, and even when the mixing rate of n-pentane with refrigerants R-32 and R-125 varies, the mixing ratio of n-pentane is limited within 14 wt. %, and thereby n-pentane is not separated from R-32 and R-125 at ordinary temperature.

The refrigerant composition in which n-pentane is dissolved in R-134a in a range of 0.1 wt. % to 7.3 wt. % of the total weight is a nonflammable refrigerant composition with a stable and uniform liquid phase, not becoming uneven in the concentration distribution, or separating into two phases even if stored for a long period. Accordingly, the refrigerant composition of the present invention can be supplied precisely and stably into a refrigerating circuit, and is moreover compatible well with refrigerating machine oil, and therefore the refrigerating machine oil such as mineral oil and alkyl benzene discharged from the compressor into the refrigerant circuit can be easily recovered in the compressor. In addition, in case the refrigerant composition would leak, it involves no possibility of fire.

Furthermore, in the refrigerating apparatus according to the present invention comprising a condenser for condensing and liquefying a refrigerant, an evaporator for evaporating a liquefied refrigerant, and a compressor for compressing an evaporated and vaporized refrigerant and discharging into the condenser, by using any one of the refrigerant compositions above mixing n-pentane with an excellent compatibility with refrigerating machine oil such as mineral oil and alkyl benzene in a chlorine radical-free refrigerant, as the refrigerant to be compressed by the compressor, the refrigerating machine oil such as mineral oil and alkyl benzene discharged from the compressor into the refrigerant circuit can be easily recovered in the compressor.

The nonflammable refrigerant composition composed of chlorine radical-free refrigerant and n-pentane blended at a specific rate according to the present invention can be charged into a same gas cylinder, and therefore the nonflammable refrigerant composition can be precisely and stably supplied into the refrigerating circuit by a charging device coupled to the refrigerating circuit.

The combination of the type of compressor such as rotary compressor or reciprocating compressor and the type of refrigerating machine oil such as mineral oil or alkyl benzene is not particularly limited in the present invention. However, when the rotary compressor is used as the compressor, partly because return of oil into the compressor is smooth, it is desired to use an alkyl benzene oil as refrigerating machine oil.

DETAILED DESCRIPTION OF THE PREFERRED EMBODIMENTS

The present invention is described hereinafter with reference to embodiments, but it should be noted that the present invention is not limited to these embodiments alone so far as not departing from the true spirit of the present invention.

Figure 1:
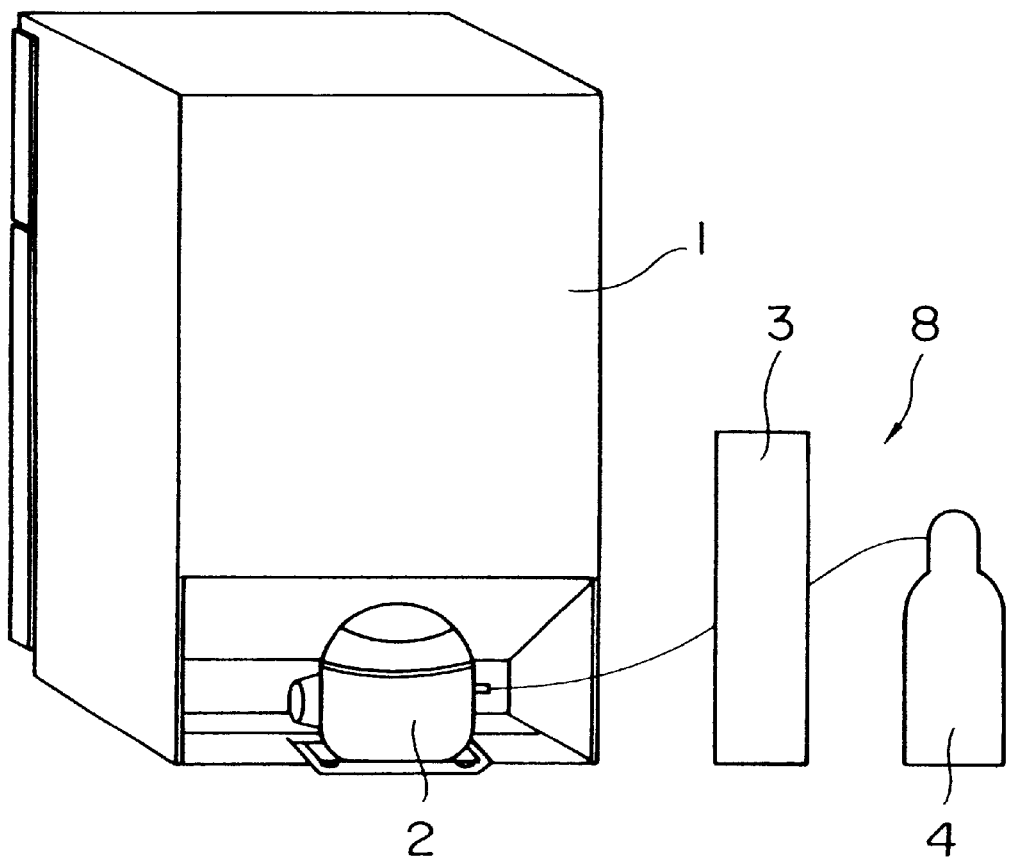
FIG. 1 is a front view of a refrigerating apparatus in one of embodiments according to the present invention.
Figure 2:
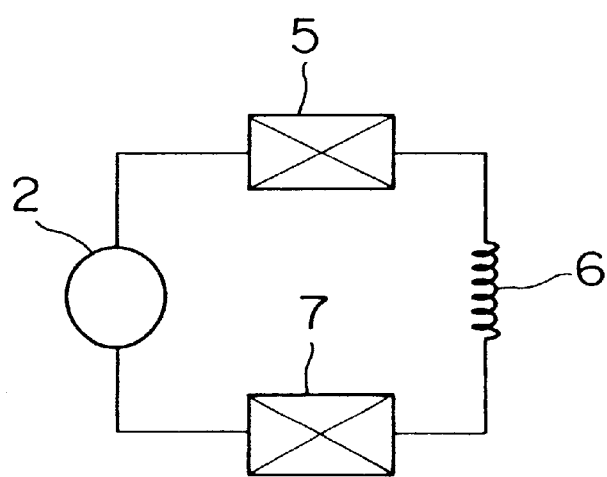
FIG. 2 is a general refrigerant circuit diagram.

FIG. 1 is a front view showing a refrigerating apparatus in one of embodiments according to the present invention. FIG. 2 is a general refrigerant circuit diagram.

Reference numeral 1 denotes a refrigerator installing a compressor 2. Reference numeral 3 designates a refrigerant charger for charging a refrigerant into the compressor 2. Reference numeral 4 shows a refrigerant container for feeding a refrigerant into the refrigerant charger 3. Reference numeral 8 denotes a charging device comprising the refrigerant charger 3 and the refrigerant container 4. The compressor 2 is sequentially combined with a condenser 5, capillary tubes 6, and an evaporator 7, and thereby a refrigerant circuit is constituted.

The refrigerant circuit shown in FIG. 2 is filled with a refrigerant mixture of R-32, R-125, R-134a, and n-pentane. The composition is 20 to 30 wt. %, preferably 25 wt. %, of R-32, 10 to 20 wt. %, preferably 15 wt. %, of 125, 40 to 60 wt. %, preferably 50 wt. %, of R-134a, and 0.1 to 14 wt. %, preferably 10 wt. %, of n-pentane.

If the blending ratio of R-32 is less than 20 wt. %, the coefficient of performance (COP) is lowered, and if exceeding 30 wt. %, it may ignite when leaking into the atmosphere. If the blending ratio of 125 is less than 10 wt. %, the discharge temperature of the refrigerant discharged from the compressor 2 is too high, and if exceeding 20 wt. %, the COP is lowered, while the global warming potential (GWP) increases. If the blending ratio of R-134a is less than 40 wt. %, the pressure in the refrigerant circuit is too high, and if exceeding 60 wt. %, the evaporation temperature becomes high.

To the refrigerant of R-134a, preliminarily, n-pentane is mixed by a specific rate, and then mixed in the refrigerant of R-32 and 125. At this time, n-pentane is added to the refrigerant of R-134a by 14 wt. % or more, and is mixed to the refrigerant of R-32 and 125 so as that the amount of n-pentane is 14 wt. % or less. That is, n-pentane is compatible well with mineral oil or alkyl benzene, but is high in boiling point and is flammable, and therefore if the blending ratio exceeds 14 wt. %, required cooling temperature may not be obtained in the evaporator 7, and it may ignite if leaking into the atmosphere. Hence, n-pentane is mixed with the refrigerant of R-134a at a specific ratio, and then mixed with the refrigerant of R-32 and 125, so that the total blending ratio of n-pentane to the total weight may not exceed 14 wt. %.

Incidentally, n-pentane can not be mixed with a chlorine radical-free refrigerant such as R-32 and 125, but is mixed with the refrigerant of R-134a at ordinary temperature, so that a mixed refrigerant may be prepared in the presence of the refrigerant of R-134a.

By mixing n-pentane by about 10 wt. %, it may optimize the cooling temperature, improve the return of refrigerating machine oil such as mineral oil and alkyl benzene to the compressor, and avoid risk of ignition.

In other embodiment, the refrigerant circuit in FIG. 2 is filled with a refrigerant composition of compatible matter having n-pentane dissolved in R-134a in a range of 0.1 wt. % to 7.3 wt. % of the total weight. More preferably, the refrigerant circuit is filled with a refrigerant composition of compatible matter having n-pentane dissolved in R-134a by about 6 wt. % of the total weight.

Figure 3:
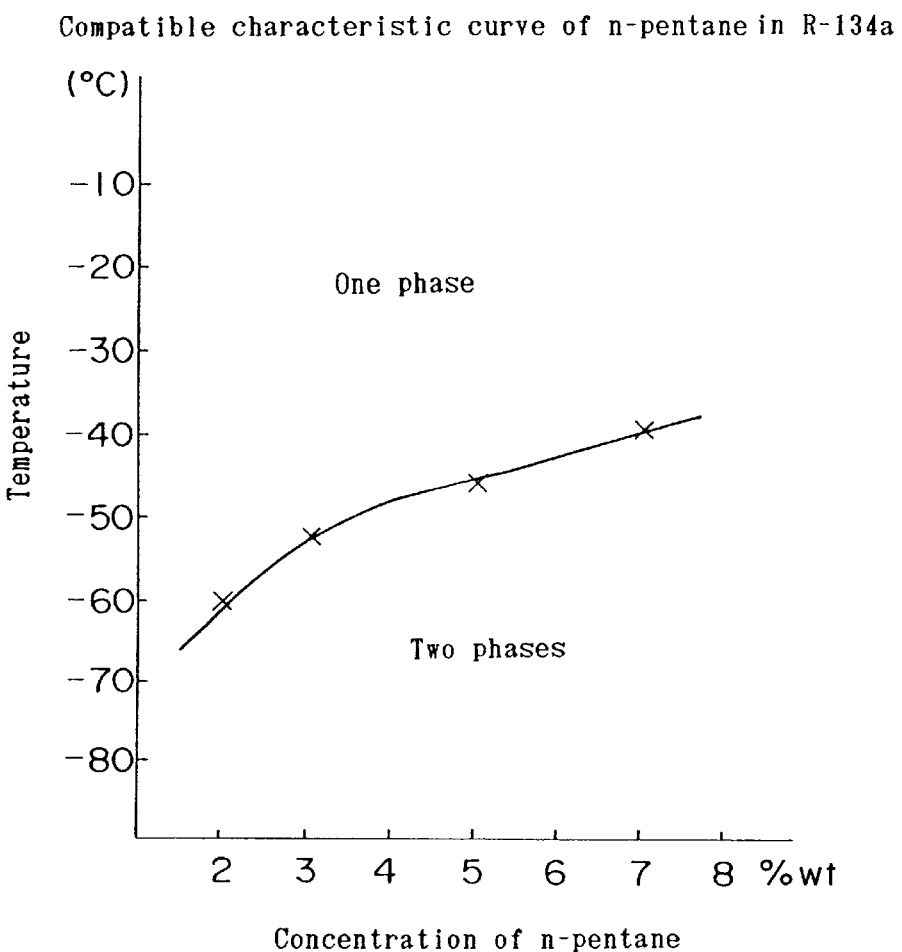
FIG. 3 is a compatibility characteristic curve of R-134a and n-pentane.

In FIG. 3, the upper region of the compatible characteristic curve is a region in which both are present uniformly and stable in one phase, and the lower region is a region in which both are separated into two phases. It can be known from the compatible characteristic curve shown in FIG. 3 that the cooling temperature may be optimized in the ordinary condition of use of the refrigerating apparatus by adjusting the mixing rate of the two in a specific range.

Figure 4:
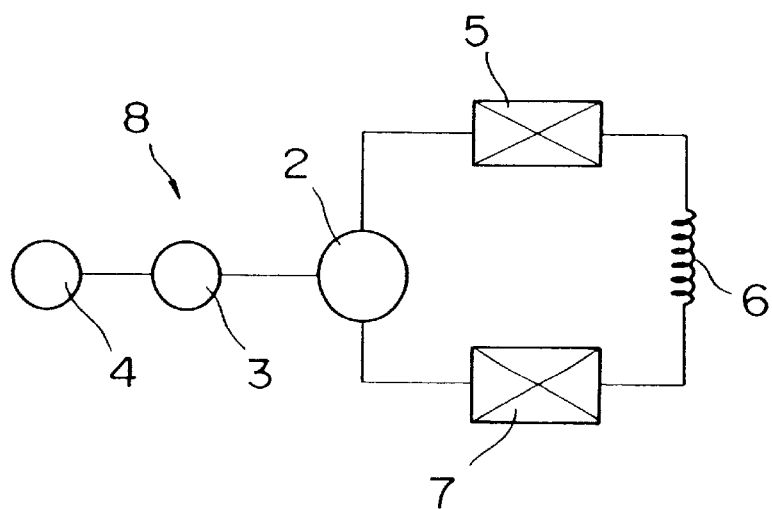
FIG. 4 is a refrigerant circuit diagram of refrigerating apparatus according to the present invention.

FIG. 4 is a refrigerant circuit diagram showing the charging device 8 for charging the refrigerant composition comprising the refrigerant charger 3 and the refrigerant container 4.

For example, the refrigerant composition of the compatible matter having n-pentane dissolved in 1,1,1,2-tetrafluoroethane in a range of 0.1 wt. % to 7.3 wt. % of the total weight is charged into the refrigerant container 4, and is supplied into the refrigerant circuit by the charging device 8 comprising the refrigerant charger 3, charging line, and others.

The composition has n-pentane by 0.1 wt. % to 7.3 wt. % of the total weight, preferably 0.2 wt. % to 7.3 wt. %, and more preferably about 6 wt. %, thereby optimizing the cooling temperature, improving the return of refrigerating machine oil such as mineral oil and alkyl benzene to the compressor, and avoiding risk of ignition.

If the dissolving ratio of n-pentane is less than 0.1 wt. %, oil return to the compressor is poor. If the dissolving ratio of n-pentane is more than 7.3 wt. %, it is not preferable because non-flammability is not enough, the liquid phase is not uniform, or components may separate into two phases.

Figure 5:
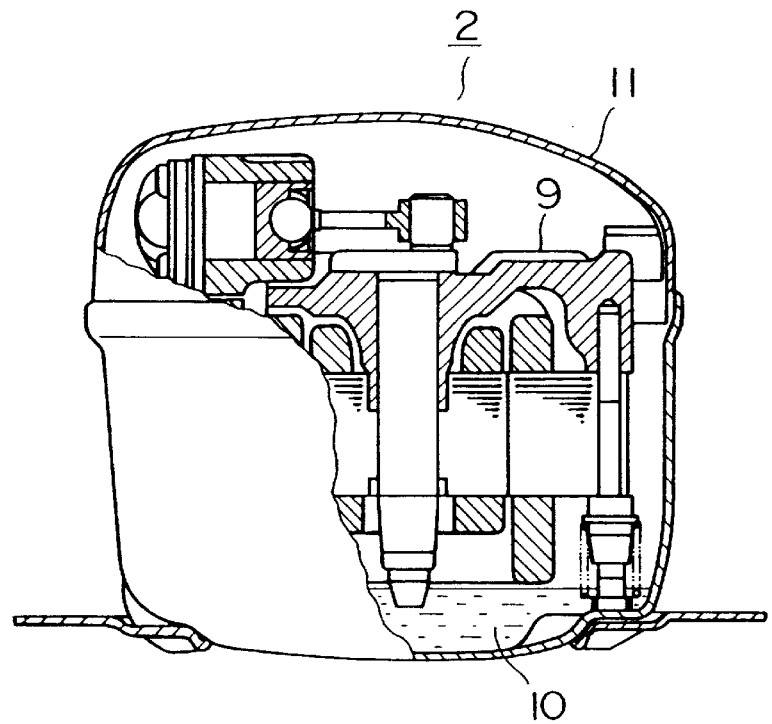
FIG. 5 is a sectional view of essential parts of compressor according to the present invention.

FIG. 5 shows an example of the compressor 2 of reciprocating type to be used in the present invention. The compressor comprises a hermetically sealed container 11, a compressor main body 9 installed in this container 11, and refrigerating machine oil 10 stored in the bottom of the sealed container 11 for lubricating the sliding parts of the compressor main body 9. The refrigerating machine oil 10 may be either mineral oil or alkyl benzene.

Figure 6:
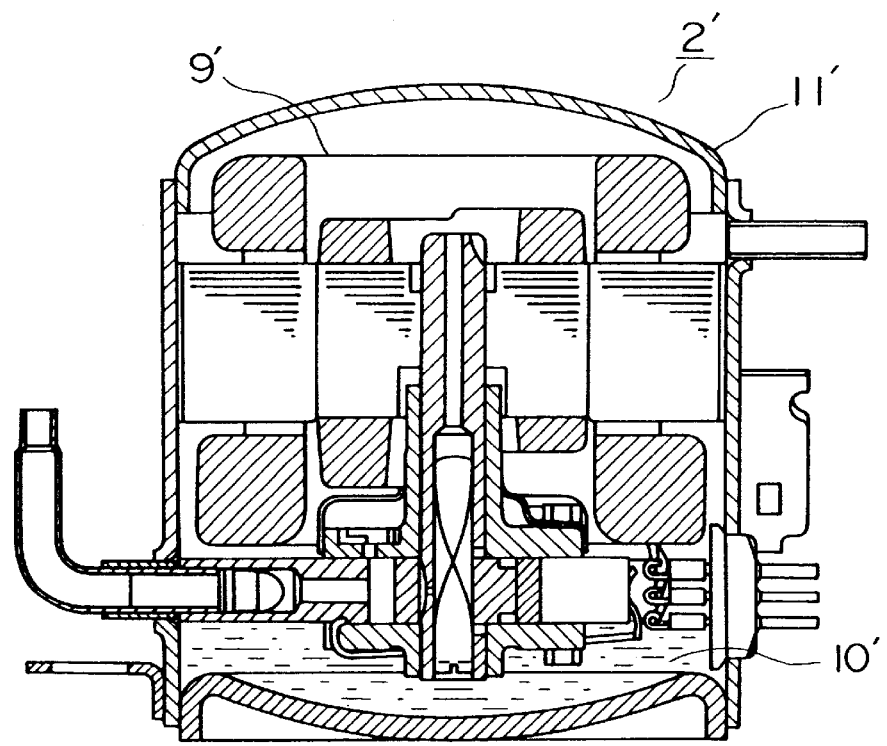
FIG. 6 is a sectional view of essential parts of other compressor according to the present invention.

FIG. 6 shows an example of compressor 2' of rotary type to be used in the invention. The compressor comprises a hermetically sealed container 11', a compressor main body 9' installed in this container 11', and refrigerating machine oil 10' stored in the bottom of the sealed container 11' for lubricating the sliding parts of the compressor main body 9'. The refrigerating machine oil 10' may be alkyl benzene.

Figure 7:
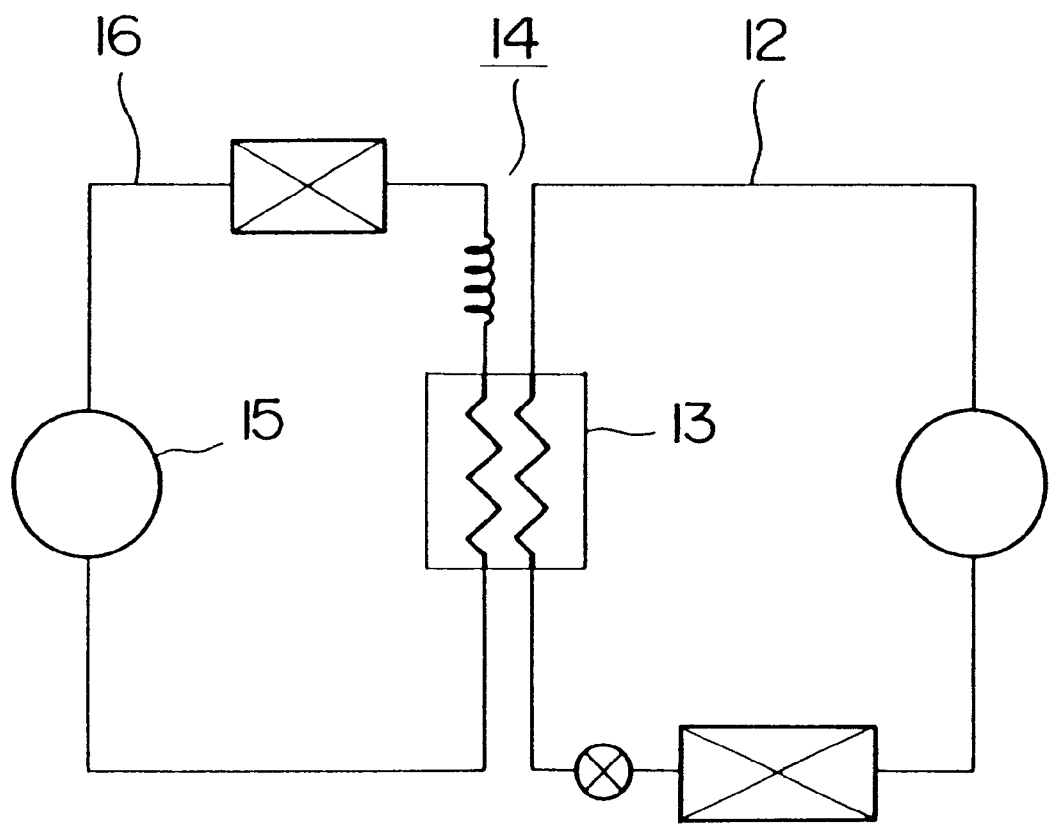
FIG. 7 is a two-element refrigerant circuit diagram showing other embodiment according to the present invention.

In the above explanation, the single-element refrigerating circuit is shown, but the same effects are obtained by composing a two-element refrigerating circuit 14 by connecting a high temperature side refrigerating circuit 16 and a low temperature side refrigerating circuit 12 with a cascade condenser 13 as shown in FIG. 7, and filling the compressor 15 of the high temperature refrigerating circuit 16 of the two-element refrigerating circuit with the refrigerant composition of the present invention and refrigerating machine oil.

As described above, according to the present invention, the refrigerant composition is composed of difluoromethane, pentafluoroethane, 1,1,1,2-tetrafluoroethane, and n-pentane, or the refrigerant composition is composed of compatible matter having n-pentane dissolved in 1,1,1,2-tetrafluoroethane by a specific rate, and therefore the refrigerant having a low risk of destroying the ozone layer may be used with the refrigerating machine oil such as mineral oil and alkyl benzene which are excellent in lubricating performance and superior in heat resistance.

In addition, in the present invention n-pentane is preliminarily mixed in 1,1,1,2-tetrafluoroethane, and then mixed in the refrigerant of difluoromethane and pentafluoroethane, and the n-pentane is mixed in a range of 0.1 wt. % to 14 wt. % of the total weight, and therefore the n-pentane not compatible with the refrigerant of difluoromethane or pentafluoroethane can be mixed with the refrigerant of difluoromethane and pentafluoroethane, so that the risk of ignition of flammable n-pentane is lowered without sacrificing the cooling performance.

Furthermore, the refrigerant composition of the present invention composed of compatible matter having n-pentane dissolved in 1,1,1,2-tetrafluoroethane in a range of 0.1 wt. % to 7.3 wt. % of the total weight presents a particularly stable and uniform liquid phase, and this is a nonflammable refrigerant composition with no possibility of n-pentane separating from the refrigerant composition, and is hence excellent in cooling performance and none in risk of ignition of the flammable n-pentane. In addition, since the refrigerant according to the present invention can be charged into a single gas cylinder without using plural ones, it is possible to supply precisely and stably into the refrigerating circuit by the charging device coupled to the refrigerating circuit.

Furthermore, the refrigerating apparatus of the present invention using these refrigerant compositions maintains the refrigerant composition in the refrigerating circuit in the same compatible matter in one uniform phase of liquid having n-pentane dissolved in 1,1,1,2-tetrafluoroethane in a range of 0.1 to 7.3 wt. % of the total weight as initially charged, and therefore the +refrigerant composition to be supplementally added later may be the same composition as that initially charged, and it is easy to control maintenance and supply refrigerant composition additionally, and it is also excellent in economy.

What is claimed is:

1. A refrigerating apparatus having a refrigerant therein comprising a condenser for condensing and liquefying a refrigerant, an evaporator for evaporating a liquefied refrigerant, a compressor for compressing an evaporated and vaporized refrigerant and discharging into the condenser, wherein a refrigerant composition comprising R-32 (difluoromethane), R125 (pentafluoroethane), R134a (1,1,1,2-tetrafluoroethane) and n-pentane is used as the refrigerant to be compressed by the compressor and a mineral oil is used as a refrigerating machine oil.

2. The refrigerating apparatus as set forth in claim 1, wherein the refrigerant composition contains n-pentane in a proportion of a range of 0.1 wt. % to 14 wt. % of the total weight.

3. The refrigerating apparatus as set forth in claim 2, wherein the refrigerant composition contains R-32 in a proportion of a range of 20 wt. % to 30 wt. % of the total weight, contains R125 in a proportion of a range of 10 wt.

% to 20 wt. % of the total weight, and contains R-134a in a proportion of a range of 40 wt. % to 60 wt. % of the total weight.

4. A refrigerating apparatus having a refrigerant therein comprising a condenser for condensing and liquefying a refrigerant, an evaporator for evaporating a liquefied refrigerant, a compressor for compressing an evaporated and vaporized refrigerant and discharging into the condenser, wherein a refrigerant composition comprising R-32, R-125, R134a and n-pentane is used as the refrigerant to be compressed by the compressor and an alkyl benzene oil is used as a refrigerating machine oil.

5. The refrigerating apparatus as set forth in claim 4, wherein the refrigerant composition contains n-pentane in a proportion of a range of 0.1 wt. % to 14 wt. % of the total weight.

6. The refrigerating apparatus as set forth in claim 5, wherein the refrigerant composition contains R-32 in a proportion of a range of 20 wt. % to 30 wt. % of the total weight, contains R-125 in a proportion of a range of 10 wt. % to 20 wt. % of the total weight, and contains R-134a in a proportion of a range of 40 wt. % to 60 wt. % of the total weight.

* * * * *

UNITED STATES PATENT AND TRADEMARK OFFICE
CERTIFICATE OF CORRECTION

PATENT NO. : 6,363,741 B2
DATED : April 2, 2002
INVENTOR(S) : Kazuo Takemasa

It is certified that error appears in the above-identified patent and that said Letters Patent is hereby corrected as shown below:

Column 1,
Line 29, "r-152a" should read -- R-152a --;

Column 4,
Lines 36 and 42, "125" should read -- R-125 --;
Lines 52 and 54, "125" should read -- R-125 --;
Line 62, "125" should read -- R-125 --; and
Line 66, "125" should read -- R-125 --.

Signed and Sealed this

Seventh Day of January, 2003

JAMES E. ROGAN
*Director of the United States Patent and Trademark Office*